US006196271B1

United States Patent
Braun et al.

(10) Patent No.: US 6,196,271 B1
(45) Date of Patent: Mar. 6, 2001

(54) LINER HOSE FOR RECONSTRUCTION OF CONDUITS AND PIPELINES AND A METHOD FOR MANUFACTURE THEREOF

(76) Inventors: Michael Braun, Langgonser Strasse 48, DE-33625 Huttenberg (DE); Bent Jorgen Rump, Lynggarden G1., Tjarbyvej 100, DK-4000 Roskilde (DE)

( * ) Notice: Subject to any disclaimer, the term of this patent is extended or adjusted under 35 U.S.C. 154(b) by 0 days.

(21) Appl. No.: 09/255,727

(22) Filed: Feb. 23, 1999

(51) Int. Cl.$^7$ .................................................... F16L 55/16
(52) U.S. Cl. .......................... 138/98; 138/97; 156/294; 264/516
(58) Field of Search ..................... 138/98, 99; 156/294, 156/287; 264/269, 516; 405/150.1

(56) References Cited

U.S. PATENT DOCUMENTS

| 5,334,429 | * | 8/1994 | Imoto et al. ................ 138/98 X |
| 5,931,199 | * | 3/1999 | Kittson et al. ................ 138/98 |

FOREIGN PATENT DOCUMENTS

| 4113002 | 10/1992 | (DE) . |
| 4427633 | 2/1995 | (DE) . |
| 0863359 | 9/1998 | (EP) . |
| 1340068 | 12/1973 | (GB) . |

* cited by examiner

*Primary Examiner*—Patrick Brinson
(74) *Attorney, Agent, or Firm*—Browdy and Neimark

(57) ABSTRACT

A liner hose for use in the reconstruction of damaged buried conduits or pipelines, in particular sewers, comprises inner and outer layers of liquid-tight plastic film material and a number of substantially uniform intermediate layers composed at least partially of a fibrous material impregnated with a curable resin.

Each intermediate layer is formed from a strip, which is substantially unstretchable in any direction and has a width such as to enable folding of the strip into a closed hose structure with unbonded seamless overlapping.

The overlap sections of all intermediate layers are located with mutual separation in the same side of the liner in its folded condition.

The liner hose is manufacture by arranging a number of said strips into a sandwich configuration with the inner calibration hose with the strips overlapping each other with a mutual substantially uniform displacement, so that the total separation of longitudinal edges of lower and upper strips is less than half the width of each strip, and folding the sandwich configuration in one operation around the inner hose.

13 Claims, 3 Drawing Sheets

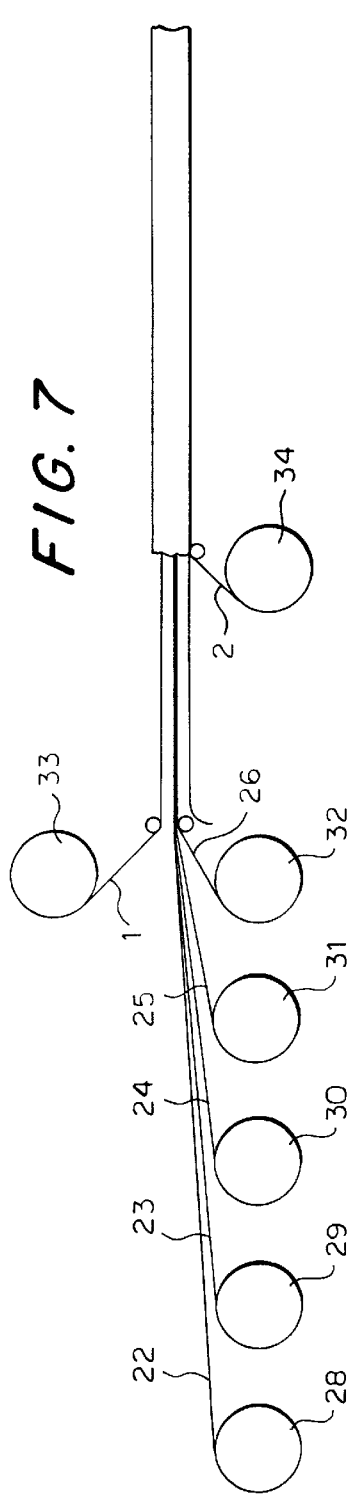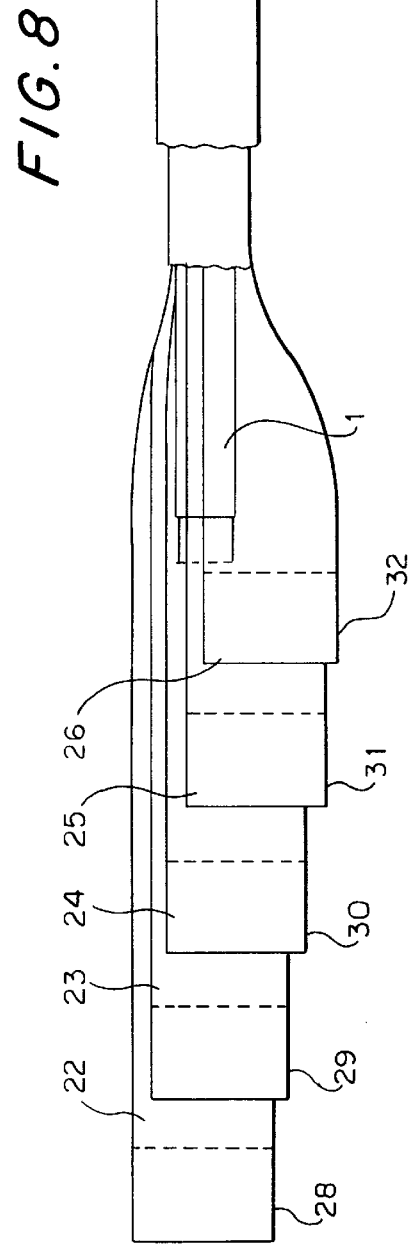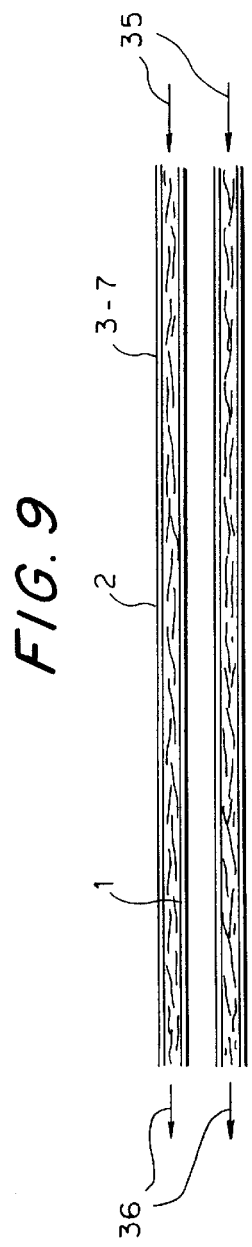

LINER HOSE FOR RECONSTRUCTION OF CONDUITS AND PIPELINES AND A METHOD FOR MANUFACTURE THEREOF

BACKGROUND OF THE INVENTION

The present invention relates to the reconstruction of buried damaged conduits and pipelines, in particular sewers, and more specifically to a liner hose for use in such reconstruction and a method of manufacturing such a liner hose.

In the reconstruction of damaged buried conduits or pipelines such as sewers it has become customary practice to draw a flexible collapsed liner hose comprising at least one layer impregnated with a curable resin through a length of the damaged conduit or pipeline followed by internal expansion of the liner to a desired tubular form matching the walls of the conduit or pipeline and exposing the interior of the liner hose to a curing agent, typically hot water or steam, which is introduced into the hose length to fill it from one end to the other and retained in the hose for a curing period of a duration sufficient to expand the hose to contact the walls of the conduit or pipeline and cure the resin. Alternatively, curing may be effected after expansion of the collapsed hose to form a tubular liner by exposure of the liner to ultraviolet radiation.

Thereby a solid and rigid lining, which is also resistant to the typically aggressive fluid matter carried through the conduit or pipeline, is established inside the damaged conduit or pipeline and complete renewal of the conduit or pipeline itself and the extensive expenses in connection therewith are avoided.

Numerous examples of liner hoses for such conduit reconstruction have been disclosed or suggested in the prior art.

In traditional liner hoses a single layer or overlapping layers of impregnated material, typically felt, fleece or other impregnatable material are confined between inner and outer layers of water-tight plastic film and formed into a hose by joining opposed longitudinal edges of the layer structure into a seam by welding or other appropriate methods. Such hoses have generally suffered from the disadvantage that they only fit one specific conduit or pipeline diameter.

Liner hoses of this traditional type have been disclosed e.g. in GB patent No 1,340,068.

In most cases, the damaged conduit or pipeline to be reconstructed will exhibit more or less significant local irregularities from the ideal circular cross-sectional profile and, if no countermeasures are taken, such irregularities may result in formation of an annular clearance between the external side of the liner hose and the walls of the conduit or pipeline with a resulting risk of penetration of water from the outside into such clearances.

In order to adapt liners hoses to provide a tight engagement with the wall of the conduit or pipeline some prior art solutions, e.g. as disclosed in European Patent Application No. 0 863 359, have prescribed the use of fibrous layers having significant elastic stretchability in the circumferential direction, up to 15 percent.

Such a stretchability results in the disadvantage, however, that uncontrollable variation in the wall thickness of the liner hose may occur. In order to counteract this disadvantage, it is suggested in the European Patent Application quoted above to use intermediate layers which overlap each other and are firmly bonded together in the overlap sections.

Other prior art solutions such as disclosed in German Patent Application No. 41 13 002 and German Patent No. 44 27 663, have suggested the use of overlapping intermediate layers which are not bonded together in the overlap sections, so that a certain stretching of the hose structure in the circumferential direction is made possible through displacement of such overlapping layers with respect to each other. In general, it has been prescribed for such solutions that the overlap sections must be uniformly distributed throughout the circumferential length of the liner profile.

Thereby, the individual fibrous layers may be prepared substantially without circumferential stretchability from fibres orientated mainly in the circumferential or transverse direction resulting in a very high circumferential rigidity of the liner after curing of the resin. In the attempts to reach a maximum of circumferential rigidity it has been disregarded, however, that by use of a general fibre orientation in the circumferential direction longitudinal stretchability of the liner hose may result, whereby local stretching may occur, when a liner hose of significant length is drawn through a damaged conduit or pipeline.

Moreover, all the prior art solutions in respect of using overlapping intermediate layers, whether bonded of unbonded in the overlap sections, have suffered from the disadvantage of a rather complicated manufacturing process requiring a separate folding step for each intermediate layer and a complicated impregnation process.

BRIEF SUMMARY OF THE INVENTION

On the background described above it is the object of the invention to provide a further improvement of liner hoses for conduit and pipe line reconstruction of the kind comprising a number of overlapping intermediate layers, which are unbonded in the overlap sections.

In particular, it is the object of the invention to provide such a liner hose having intermediate layers which are substantially unstretchable both in the transverse direction and the longitudinal direction and can be manufactured at comparatively low costs by a process offering significant simplification with respect to prior art liners.

According to the invention, a liner hose for use in the reconstruction of damaged buried conduits or pipelines, in particular sewers, is provided, comprising inner and outer layers of liquid-tight plastic film material and a number of substantially uniform intermediate layers composed at least partially of a fibrous material impregnated with a curable resin, said liner hose being adapted for introduction into a damaged conduit or pipeline in a collapsed folded condition, followed by expansion of the hose to a substantially tubular structure lining the conduit or pipeline in contact with the walls thereof and curing of said curable resin by introduction of a curing agent into the conduit defined by said inner layer throughout the length of the hose, each of said intermediate layers being formed from a strip, which is substantially unstretchable in any direction and has a width such as to enable folding of the strip into a closed hose structure of the intermediate layer by unbonded seamless overlapping of opposed longitudinal edge zones of said strip in an overlap section, the overlap sections of said number of intermediate layers being all located with mutual separation in the same side of the liner in said folded condition.

By the location of the overlap sections of all intermediate layers in the same side of the liner in its folded condition a significant simplification of the manufacturing process is made possible, whereby all intermediate layers can be folded in a single process step.

The use of intermediate layers, which are substantially uniform in structure throughout the wall thickness of the liner hose, provides a very homogenous structure, by which liner hoses in different dimensions can be prepared from a varying number of a single basic type of intermediate layer. Thereby, also a further contribution is made to simplification of the manufacturing process.

Accordingly, the invention also provides a method of manufacturing the liner hose as defined, for use in the reconstruction of damaged, buried conduits or pipelines, in particular sewers, comprising the steps of arranging a number of said strips into a sandwich configuration in which the strips overlap each other with such a mutual substantially uniform displacement of corresponding longitudinal edges of adjoining strips in said transverse direction substantially at right angles to said longitudinal edges, that the total separation of said longitudinal edges of lower and upper extreme strips in said configuration is less than half the width of each strip, folding said sandwich configuration around said inner hose in a single operation into an intermediate hose form with unbonded seamless overlapping of opposed longitudinal edge zones of each strip, wrapping said intermediate hose form with an outer layer of liquid-tight plastic film material to form the liner hose, cutting said liner hose in determined lengths and impregnating the intermediate layers of each length of liner hose between said inner and outer hose layers with a curable resin.

BRIEF DESCRIPTION OF THE SEVERAL VIEWS OF THE DRAWING

Further details and advantages of the invention will be described in the following with reference to the accompanying schematical drawings, in which

FIGS. 7 and 8 are a side view and a plan view, respectively, of parts of a process plant for performing the folding operation illustrated in FIGS. 5 and 6; and FIG. 9 is a schematical illustration of an impregnation and evacuation process for a length of liner hose resulting from the manufacturing process illustrated in FIGS. 5 to 9.

DETAILED DESCRIPTION OF THE INVENTION.

Figure 1:
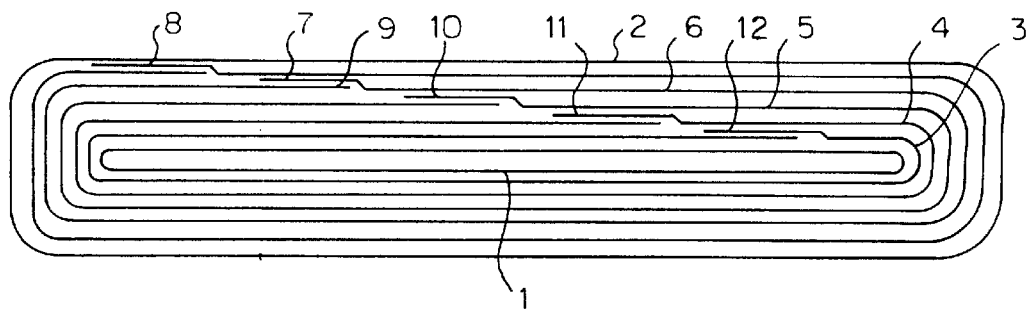
FIG. 1 shows the cross-sectional profile of the overall structure an embodiment of the liner hose of the invention.

The hose structure shown in FIG. 1, in which the individual layers are shown by single solid lines, comprises an inner layer 1 and an outer layer 2 that are both of a liquid-tight plastic film material such as polyester, polyethylene, polypropylene, polyamide or a laminate of such materials. If the impregnating resin to be described in the following contains volatile constituents like styrol, the plastic film material for the inner and outer layers 1 and 2 will have to be a gas-tight material. In the completed liner hose each of inner and outer layers 1 and 2 form a closed hose structure, The inner layer may formed, e.g. by well-known extruder technology, as a seamless hose, which in use of the liner hose will serve as a calibration hose, and the outer layer may be formed be wrapping the film material around the hose structure and closing it by a longitudinal weld seam.

Confined between inner and outer layers 1 and 2 are a number of intermediate layers, in the illustrated embodiment five intermediate layers 3 to 7, the structure of which will be described below with reference to FIGS. 2 to 4.

According to the invention and further described below with reference to FIGS. 5 to 7, each of intermediate layers 3 to 7 is formed from a strip having a width such as to enable folding of the strip around the closed inner layer 1 or a preceding intermediate layer into a closed hose structure with unbonded and seamless overlapping of longitudinal edge zones of the strip in overlap sections 6 to 12. which are all located with mutual separation in the same side of the liner hose in the folded collapsed condition shown in FIG. 1.

To provide the overlap sections 8 to 12 each of the strips used for forming intermediate layers 3 to 7 should have a width exceeding the circumferential length of the inner hose 1 by an amount sufficient to allow some stretching of the overall hose structure in the circumferential direction for adaption of the liner hose to local irregularities in the conduit or pipeline, in which it is used. In practice the overlap sections 8 to 12 may typically amount to 5 to 20 percent of the overall width of the individual strip.

In the embodiment shown, each of the strips 13 used for formation of the intermediate layers 3 to 7, except the innermost layer 3 facing the inner hose 1, comprises a sandwich structure of first and second sublayers 14 and 15. Sublayer 14 is a substantially 90° roving web of crossing flat fibreglass threads 16 and 17 with orientations corresponding to the longitudinal and transverse directions, respectively, of strip 13. The second sublayer 15 is a fibreglass fleece layer with a high proportion of fibres 18 having a general orientation in the transverse direction parallel to threads 17 of layer 14, but also a significant proportion of fibres 19 oriented in the longitudinal direction of strip 13 parallel to threads 16 of sublayer 14.

The combination of the first sublayer 14 in the form of a web of crossing threads 16 and 17 with the high proportion of transversely oriented fibres 18 in the fleece layer 15 provides substantial unstretchability of the strip 13 in the transverse direction and a very high circumferential rigidity of the intermediate layer formed from the strip in the overall hose structure. Likewise, the combination of longitudinal threads 17 in the web 14 with the significant proportion of longitudinal fibres 19 in the fleece layer 15 provides sufficient unstretchability of strip 13 in the longitudinal direction to absorb the tensile load and avoid stretching of the hose structure, when the liner hose is drawn through a conduit or pipeline. The fibres 18 and 19 in the fleece layer 15 are typically cut glass fibre having a length from 60 to 80 mm and the amount of fibres per square meter of strip 13 may be adjustable. In particular, the amount of fibres in fleece layer 15 may vary between the individual intermediate layers 3 to 7, e.g. by a gradual increase in the direction from the innermost layer 3 to the outermost layer 7 to attain a constant elasticity module E throughout the thickness of the hose structure.

Figure 3:
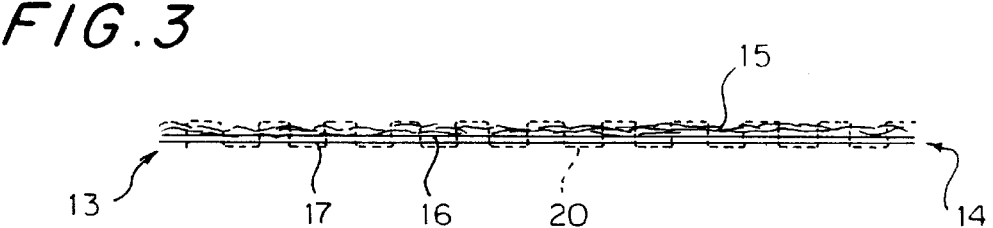
FIGS. 3 and 4 are schematical cross-sectional representations of the intermediate layer in FIG. 2 and of an innermost intermediate layer in the hose structure in FIG. 1, respectively.

As shown in FIG. 3 the fleece layer 15 may be secured to the web 14 by stitch-bonding using a relatively thin fibre thread 20, e.g. of fibreglass.

In each of intermediate layers 3 to 7 the main function of the web 13 is to serve as a reinforcing support layer providing dimension stability in the circumferential and longitudinal directions, whereas the main function of the fleece layer 15 is to absorb and retain the resin used for impregnation of the hose structure as described in the following.

In the overall hose structure all of intermediate layers 4 to 7 are arranged to have the fleece layer 15 facing the inner plastic film layer 1.

Typically, each intermediate layer will have a relatively moderate thickness, e.g. from 1 to 2 mm, and a grammage typecally ranging from about 500 to about 1000 g per square meter. Thereby, depending on requirements with respect to strength and rigidity the number of intermediate layers incorporated in the hose structure may be varied, e.g. from two to ten intermediate layers, to match diameters of conduits or pipelines to be reconstructed ranging from 100 to 1200 mm.

Figure 2:
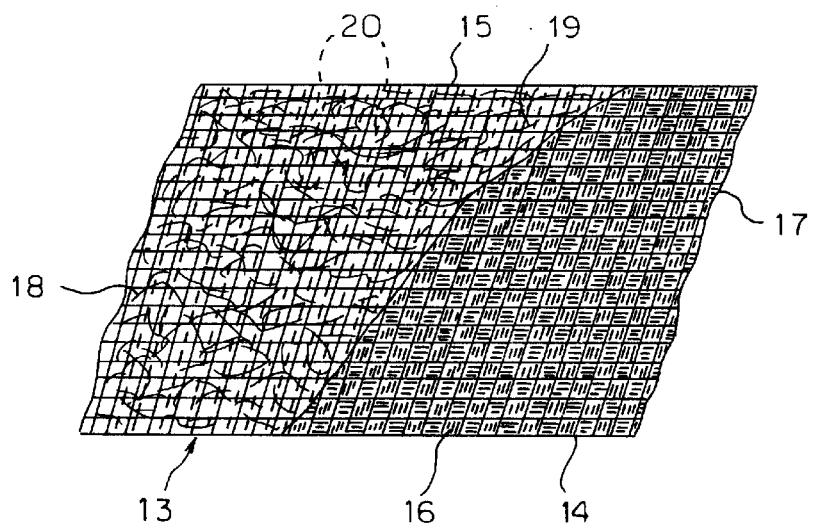
FIG. 2 is a perspective partial view of a single intermediate layer in the hose structure in FIG. 1.
Figure 4:

As shown in FIG. 4, the innermost intermediate layer 3 arranged in contact with the inner plastic film layer 1 comprises in addition to a sandwich configuration of sublayers 14' and 15' corresponding to sublayers 14 and 15 in the remaining intermediate layers 4 to 7, as shown in FIGS. 2 and 3, a further fibrous layer 21 comprising polyester or glass felt or fleece and arranged in contact with the fleece layer 15', such that in the overall hose structure the felt layer 21 will be in contact with the inner plastic film layer 1. Thereby, a considerable amount of the impregnating resin will be absorbed in the additional felt layer 21 to improve the chemical resistance of the liner hose.

The additional felt layer 21 may be bonded to the sublayers 14' and 15' by the same stitch-bond as shown used in FIGS. 2 and 3 using relatively thin fibre threads 20'.

Figure 5:
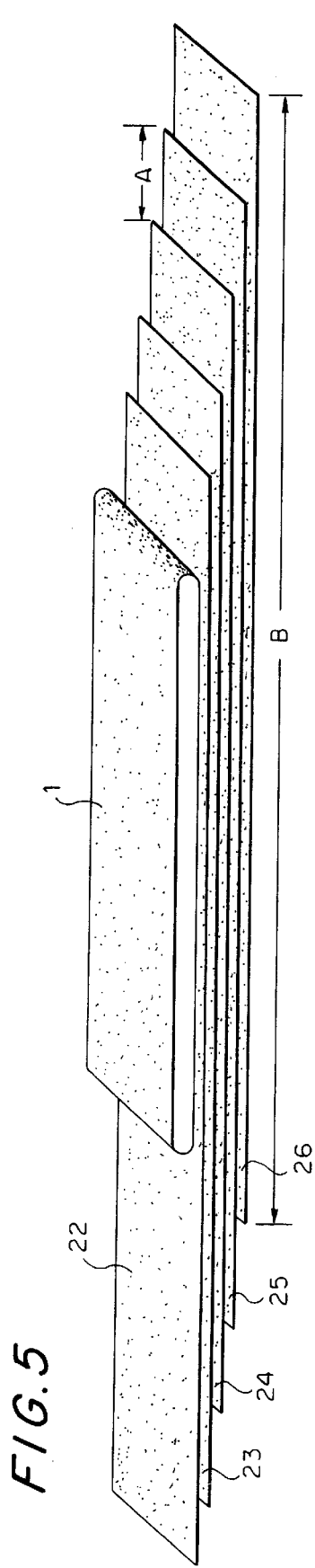
FIGS. 5 and 6 illustrate the folding of intermediate layers in the hose structure in FIG. 1 into an intermediate hose structure.
Figure 6:
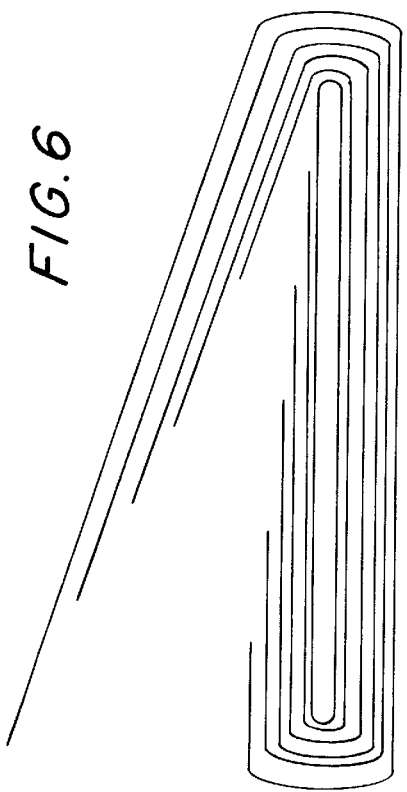

As shown in FIGS. 5 and 6, the configuration of intermediate layers 3 to 7 in the hose structure in FIG. 1 may be formed by arranging strips 22 to 26 of uniform size and dimensions, from which the intermediate layers 3 to 7 are to be formed, in a sandwich configuration with the inner hose 1 on top. The strips 22 to 26 overlap each other with such a mutual substantially uniform displacement A of corresponding longitudinal side edges 27 in the transverse direction of the strips, that the total separation of these longitudinal edges 27 from strip 22 to strip 26, i.e. 4A, is less than half the width B of the individual strips.

Strips 22 to 26 are then folded or wrapped around the inner hose 1 as shown in FIG. 6 to provide the hose structure in FIG. 1.

In the production facility illustrated very schematically and by way of example only in FIG. 7 and 8, strips 22 to 26 are advanced from a number of rolls 28 to 32 and the inner plastic film hose 1 is advanced from a roll 33 to form the sandwich configuration shown in FIG. 5. During continued advancement of the sandwich configuration thus prepared strips 22 to 26 are folded in one operation around the inner hose 1 to form the intermediate hose structure composed of inner hose 1 and individually overlapping intermediate layers 3 to 7 and subsequently the outer film layer 2, which is advanced from a roll 34 is wrapped around the folded intermediate hose structure and closed by a longitudinal weld seam.

The continuous hose structure obtained by this single step process is then cut in suitable lengths, typically from about 30 to about 60 meters, but in some applications even up to 250 meters, and each such length is impregnated with resin, as schematically illustrated in FIG. 9, by a process, known per se, in which a low viscosity resin fluid is injected by injection means 35 from one end of the cut length of liner hose and sucked through the liner hose by simultaneous evacuation of air therefrom by vacuum means 36 at the other end of the cut length of liner hose.

Following this impregnation process the cut length of liner hose is calibrated to a uniform wall thickness, e.g. by calendaring.

To secure even distribution of the resin injected in a low viscosity state in the liner hose and retention of the resin in the intermediate layers of the hose structure, a gelating agent is preferably added to the impregnating resin. By this addition the viscosity of the resin will increase during the calibration step to secure retention of the resin in the intermediate layers.

What is claimed is:

1. A liner hose for use in the reconstruction of damaged buried conduits or pipelines, in particular sewers, comprising inner and outer layers of liquid-tight plastic film material and a number of substantially uniform intermediate layers composed at least partially of a fibrous material impregnated with a curable resin, said liner hose being adapted for introduction into a damaged conduit or pipeline in a collapsed folded condition, followed by expansion of the hose to a substantially tubular structure lining the conduit or pipeline in contact with the walls thereof and curing of said curable resin by introduction of a curing agent into the conduit defined by said inner layer throughout the length of the hose, each of said intermediate layers being formed from a strip, which is substantially unstretchable in any direction and has a width such as to enable folding of the strip into a closed hose structure of the intermediate layer by unbonded seamless overlapping of opposed longitudinal edge zones of said strip in an overlap section, the overlap sections of said number of intermediate layers being all located with mutual separation in the same side of the liner in said folded condition.

2. A liner hose as claimed in claim 1, wherein the overlapping zones of each strip have a width of 5 to 20% of the overall width of the strip.

3. A liner hose as claimed in claim 1, wherein the number of intermediate layers is from 2 to 10.

4. A liner hose as claimed in claim 1, wherein each of said strips comprises a laminate structure of first and second sublayers, at least one of which comprises said fibrous material in the form of fibres of which a high proportion are oriented in a transverse direction of said strip to provide high circumferential rigidity to the liner hose after curing, whereas another proportion of the fibres are oriented in the longitudinal direction of the strip to provide a desired tensile strength in the longitudinal direction of the hose before curing.

5. A liner hose as claimed in claim 4, wherein said first sublayer of each strip comprises a substantially 90° roving web of crossing flat fibreglass threads with orientations corresponding to said transverse and longitudinal directions, whereas said second sublayer is a fibreglass fleece layer bonded to said web and comprising said high proportion of fibres with said transverse orientation and said proportion of fibres with said longitudinal orientation, said intermediate layers being arranged in said hose structure with said second sublayer facing said inner plastic film layer.

6. A liner hose as claimed in claim 5, wherein the threads of said web and the fibres of said fleece layer are composed of C glass fibres.

7. A liner hose as claimed in claim 5, wherein said fleece layer is stitch-bonded to said web.

8. Aliner hose as claimed in claim 5, wherein the grammage of said intermediate layer is from 500 to 1000 g per square meter.

9. A liner hose as claimed in claim 2, wherein an innermost intermediate layer comprises a further sublayer containing a fibrous fleece or felt, said further sublayer being bonded to said first and second sublayers in engagement with said second sublayer, said innermost layer being arranged in the hose structure with said further sublayer facing said inner plastic film layer.

10. A liner hose as claimed in claim 1, wherein said curable resin is a low-viscosity fluid containing a gelating agent.

11. A method of manufacturing a liner hose as claimed in claim 1, for use in the reconstruction of damaged buried conduits or pipelines, in particular sewers, comprising the steps of arranging a number of said strips into a sandwich configuration in which the strips overlap each other with such a mutual substantially uniform displacement of corresponding longitudinal edges of adjoining strips in said transverse direction substantially at right angles to said longitudinal edges, that the total separation of said longitudinal edges of lower and upper extreme strips in said configuration is less than half the width of each strip, folding said sandwich configuration around said inner hose in a single operation into an intermediate hose form with unbonded seamless overlapping of opposed longitudinal edge zones of each strip, wrapping said intermediate hose form with an outer layer of liquid-tight plastic film material to form the liner hose, cutting said liner hose in determined lengths, impregnating the intermediate layers of each length of liner hose between said inner and outer hose layers with a curable resin and calibrating said length of liner hose to a substantially uniform thickness of the hose wall composed of said inner, outer and intermediate layers.

12. A method as claimed in claim 9, wherein said impregnation of the intermediate layers is carried out by sucking a low-viscosity resin fluid through said hose length from one end thereof under simultaneous evacuation of air by means of vacuum applied to the other end of the hose length.

13. A method as claimed in claim 9, wherein a gelating agent is added to said low viscosity resin fluid to provide a significant increase of viscosity of said resin after said calibration step.

* * * * *

UNITED STATES PATENT AND TRADEMARK OFFICE
CERTIFICATE OF CORRECTION

PATENT NO. : 6,196,271 B1
DATED : March 6, 2001
INVENTOR(S) : Bent Jorgen Rump et al.

Page 1 of 1

It is certified that error appears in the above-identified patent and that said Letters Patent is hereby corrected as shown below:

Title page, column 1,
Line (12), delete "Braun et al." and insert therefor -- Rump et al. --;
Line (76), delete "Michael Braun, Langgonser Strasse 48, DE-33625 Huttenberg (DE); Bent Jorgen Rump, Lynggardeng Gl., Tjarbyvej 100, DK-400- Roskilde (DE)" and insert therefor -- Bent Jorgen Rump, Lynggarden Gl., Tjarbyvej 100, DK-400- Roskilde (DE); Michael Braun, Langgonser Strasse 48, DE-33625 Huttenberg (DE) --

Signed and Sealed this

Twenty-seventh Day of November, 2001

*Attest:*

NICHOLAS P. GODICI
*Attesting Officer*  Acting Director of the United States Patent and Trademark Office